(12) United States Patent
Canegallo et al.

(10) Patent No.: US 8,340,576 B2
(45) Date of Patent: Dec. 25, 2012

(54) ELECTRONIC CIRCUIT FOR COMMUNICATING THROUGH CAPACITIVE COUPLING

(75) Inventors: Roberto Canegallo, Rimini (IT); Mauro Scandiuzzo, Trento (IT); Eleonora Franchi Scarselli, Bologna (IT); Antonio Gnudi, Bologna (IT); Roberto Guerrieri, Bologna (IT); Federico Natali, Bologna (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 327 days.

(21) Appl. No.: 12/826,565

(22) Filed: Jun. 29, 2010

(65) Prior Publication Data

US 2011/0319014 A1    Dec. 29, 2011

(51) Int. Cl.
*H04B 5/00* (2006.01)
(52) U.S. Cl. ......... 455/41.1; 455/20; 455/118; 455/260; 455/84; 455/23; 455/73; 455/86; 375/340; 375/327; 375/232; 326/83; 326/86; 326/96
(58) Field of Classification Search .................. 455/41.1, 455/20, 260, 118, 23, 84, 75, 73, 86, 65
See application file for complete search history.

(56) References Cited

U.S. PATENT DOCUMENTS

| | | | | |
|---|---|---|---|---|
| 5,483,198 | A * | 1/1996 | Nunn ........................... | 330/279 |
| 5,737,697 | A * | 4/1998 | Yamada ....................... | 455/126 |
| 6,518,679 | B2 * | 2/2003 | Lu et al. ........................ | 257/797 |
| 6,870,271 | B2 * | 3/2005 | Sutherland et al. ........... | 257/777 |
| 6,875,640 | B1 * | 4/2005 | Farnworth et al. ............ | 438/127 |
| 6,916,719 | B1 * | 7/2005 | Knight et al. ................. | 438/381 |
| 6,972,596 | B1 * | 12/2005 | Proebsting et al. ............ | 326/83 |
| 7,067,910 | B2 | 6/2006 | Drost et al. | |
| 7,200,830 | B2 | 4/2007 | Drost et al. | |
| 7,456,637 | B2 * | 11/2008 | Canegallo et al. ............ | 324/662 |
| 8,154,307 | B2 * | 4/2012 | Cathelin et al. ............... | 324/613 |
| 2002/0191835 | A1 | 12/2002 | Lu et al. | |
| 2005/0075080 | A1 | 4/2005 | Zhang | |
| 2007/0067115 | A1 | 3/2007 | Canegallo et al. | |
| 2007/0092011 | A1 | 4/2007 | Ciccarelli et al. | |
| 2008/0225987 | A1 | 9/2008 | Fazzi et al. | |
| 2009/0168860 | A1 | 7/2009 | Magagni et al. | |
| 2009/0168938 | A1 | 7/2009 | Ciccarelli et al. | |

OTHER PUBLICATIONS

Franchi et al., "3D Capacitive Transmission of Analog Signals with Automatic Compensation of the Voltage Attenuation," Proceedings of the 1998 IEEE International Symposium on Circuits and Systems, May 31-Jun. 3, 1998, 4 pages.

* cited by examiner

*Primary Examiner* — Marceau Milord
(74) *Attorney, Agent, or Firm* — Seed IP Law Group PLLC (57) ABSTRACT

A device and method to compensate for distortions of amplitude that afflict systems for communicating through capacitive coupling. A circuit includes a first transmitter stage, a first receiver stage, and a first coupling capacitor, coupled between the first transmitter stage and the first receiver stage. The first receiver stage includes a calibration amplifier of a variable-gain type coupled between the first coupling capacitor and an output of the electronic circuit. The electronic circuit includes a reference channel formed by: a transmission calibration stage; a reception calibration stage; and a reference capacitor coupled between the transmission calibration stage and the reception calibration stage. The reception calibration stage includes: a reception amplifier of a variable-gain type, having an input coupled to the reference capacitor, and a gain controller, having an input coupled to an output of the reception amplifier and an output coupled to control terminals of the reception and calibration amplifiers.

30 Claims, 4 Drawing Sheets

ELECTRONIC CIRCUIT FOR COMMUNICATING THROUGH CAPACITIVE COUPLING

BACKGROUND

1. Technical Field

The present disclosure relates to an electronic circuit for communicating through capacitive coupling.

2. Description of the Related Art

Systems for communications by capacitive coupling between integrated circuits (or chips) are available, i.e., communication systems that enable communications of a so-called "inter-chip" type to be carried out thanks to the presence of a capacitive coupling between two or more integrated circuits. An example of communication by capacitive coupling between two integrated circuits is provided in the U.S. Pat. No. 7,067,910. Likewise, further references to the possibility of capacitive coupling of two integrated circuits for the purposes of communication are provided, for example, in the U.S. Pat. No. 6,972,596. These systems for communicating through capacitive coupling can be used also in the case of communications of a so-called "intra-chip" type, i.e., for enabling communications between different regions of one and the same integrated circuit.

As compared to radiofrequency communications systems, which, as described, for example, in the document No. US2005/0075080, can also be used for carrying out communications both of an "inter-chip" type and of an "intra-chip" type, systems for communicating through capacitive coupling are typically characterized by a lower circuit complexity given that they envisages the use of baseband communications techniques. In fact, coupling between the integrated circuits, or else between regions of one and the same integrated circuit, occurs in the so-called "near field", without the need to generate and modulate radiofrequency carriers. Consequently, in the field of communications of a contactless type, systems for communicating through capacitive coupling are encountering increasingly wider use.

BRIEF SUMMARY

One embodiment of the disclosure provides an electronic circuit for communicating through capacitive coupling that may partially overcome the drawbacks of the known art.

In an embodiment, an electronic communication circuit, comprises: a first transmitter stage; a first receiver stage; and a first coupling capacitor connected between the first transmitter stage and the first receiver stage. The receiver stage further comprises: a calibration amplifier of a variable-gain type connected between the first coupling capacitor and an output of the electronic communication circuit; and a reference channel that includes a transmission calibration stage; a reception calibration stage; and a reference capacitor connected between the transmission calibration stage and the reception calibration stage. The reception calibration stage further comprises: a reception amplifier of a variable-gain type, which has an input connected to the reference capacitor; and a gain-control circuit having an input connected to an output of the reception amplifier and an output connected to control terminals of the reception amplifier and of the calibration amplifier. In one embodiment, the gain-control circuit further comprises: a reception reference circuit configured to generate a reception reference voltage; and a reception comparison stage which has a first input connected to the output of the reception amplifier, and a second input connected to the reception reference circuit. In another embodiment, the reception comparison stage is configured to supply, on an output of its own, a reception control signal indicating a difference between an amplitude of a reception reference signal present on the output of the reception amplifier and the reception reference voltage.

In an embodiment, the transmission calibration stage further comprises: a transmission reference circuit configured to generate a transmission reference voltage; a transmission amplifier of a variable-gain type, which has an output connected to the reference capacitor; and a transmission comparison stage, which has a first input connected to the output of the transmission amplifier and a second input connected to the transmission reference circuit. The transmission comparison stage is configured to supply, on an output of its own, a transmission control signal indicating a difference between an amplitude of a transmission reference signal present on the output of the transmission amplifier and the transmission reference voltage, the output of the transmission comparison stage being connected to a control terminal of the transmission amplifier. In one embodiment, the transmission reference signal and the reception reference signal are of a differential type. In another embodiment, the transmission and reception reference circuits are voltage generators of a band-gap type.

In an embodiment, the reception comparison stage comprises: a first conversion circuit configured to generate a first current proportional to the amplitude of the reception reference signal; a second conversion circuit configured to generate a second current proportional to the reception reference voltage; and an integrator circuit configured to integrate in time a current difference proportional to the difference between said first and second currents, generating the reception control signal. In one embodiment, the first coupling capacitor is formed by a transmission electrode and by a reception electrode, and the first transmitter stage and the first receiver stage are, respectively, connected to the transmission electrode and to the reception electrode where the reception amplifier is further connected to the reception reference electrode. In one embodiment, the first coupling capacitor and the reference capacitor are the same.

In an embodiment, the electronic circuit further comprises a second transmitter stage; a second receiver stage; a second coupling capacitor connected between the second transmitter stage and the second receiver stage that comprises: an additional amplifier having a control terminal connected to the gain-control circuit. In another embodiment, the first transmitter stage and the transmission calibration stage are formed in a first region of a chip, and the first reception stage and the reception calibration stage are formed in a second region of said chip. In another embodiment, an electronic device comprises: a first integrated circuit and a second integrated circuit together forming an electronic circuit where the first transmitter stage and the transmission calibration stage are formed in the first integrated circuit, and the first receiver stage and the reception calibration stage are formed in the second integrated circuit. In one embodiment, the first coupling capacitor is formed by a transmission electrode and by a reception electrode, and the first transmitter stage and the first receiver stage are respectively connected to the transmission electrode and to the reception electrode, the reception amplifier is connected to the reception reference electrode; the first and second integrated circuits defining, respectively, a first top surface and a second top surface, the transmission electrode and the transmission reference electrode are arranged on the first top surface, the reception electrode and the reception reference electrode is arranged on the second top surface. The first and second integrated circuits are arranged in face-to-face mode with the first and second top surfaces that face one another.

In an embodiment, a communication method comprises transmitting a communication signal on a transmission electrode of a coupling capacitor; receiving a reception signal on a reception electrode of the coupling capacitor; and amplifying the reception signal; transmitting a transmission reference signal on a transmission reference electrode of a reference capacitor; receiving a coupling signal on a reception reference electrode of said reference capacitor; amplifying said coupling signal, generating a reception reference signal; generating a reception control signal as a function of said reception reference signal; and controlling a level of amplification in amplifying the coupling signal and in amplifying the reception signal as a function of the reception control signal. In an embodiment, the communication method further comprises: generating a reception reference voltage; and generating a reception control signal further comprises: determining a difference between an amplitude of the reception reference signal and the reception reference voltage. In an embodiment, the communication method further comprises: generating a transmission reference voltage; receiving a calibration signal; amplifying the calibration signal; generating a transmission reference signal; generating a transmission control signal as a function of the transmission reference signal and the transmission reference voltage; and controlling a level of amplification in amplifying the calibration signal, as a function of the transmission control signal.

In an embodiment, an electronic communication circuit, comprises: a first transmitter stage; a first receiver stage; and a first coupling capacitor coupled between the first transmitter stage and the first receiver stage, said first receiver stage including a compensation amplifier of a variable-gain type coupled between the first coupling capacitor and an output of the electronic communication circuit; and a reference channel including: a transmission calibration stage; a reception calibration stage; and a reference capacitor coupled between the transmission calibration stage and the reception calibration stage, wherein the reception calibration stage includes: a reference amplifier of a variable-gain type, which has an input coupled to said reference capacitor; and a gain controller having an input coupled to an output of the reference amplifier and configured to generate at least one control signal to control a gain of the reference amplifier and a gain of the compensation amplifier based on the output of the reference amplifier. In an embodiment, said gain-controller comprises: a reception reference voltage generator configured to generate a reception reference voltage; and a reception comparison stage, coupled to the output of said reference amplifier and to said reception reference voltage generator, and configured to supply a reception control signal indicating a difference between an amplitude of a reception reference signal present on the output of said reference amplifier and said reception reference voltage. In an embodiment, said transmission calibration stage comprises: a transmission reference voltage generator configured to generate a transmission reference voltage; a transmission amplifier of a variable-gain type, which has an output coupled to said reference capacitor; and a transmission comparison stage, coupled to the output of said transmission amplifier and to said transmission reference voltage generator, and configured to supply a transmission control signal indicating a difference between an amplitude of a transmission reference signal present on the output of said transmission amplifier and said transmission reference voltage, and said transmission control signal being coupled to a control terminal of said transmission amplifier. In an embodiment, said transmission reference signal and said reception reference signal are of a differential type. In an embodiment, said transmission and reception reference voltage generators are bandgap voltage generators. In an embodiment, said reception comparison stage comprises: a first conversion circuit configured to generate a first current proportional to the amplitude of said reception reference signal; a second conversion circuit configured to generate a second current proportional to said reception reference voltage; and an integrator configured to integrate in time a current difference proportional to a difference between said first and second currents, generating said reception control signal. In an embodiment, the at least one gain control signal is a gain control signal coupled to a control terminal of the reference amplifier and to a control terminal of the compensation amplifier. In an embodiment, said first coupling capacitor comprises: a transmission electrode; and a reception electrode; and said reference capacitor comprises: a transmission reference electrode; and a reception reference electrode, said first transmitter stage and said first receiver stage being, respectively, coupled to said transmission electrode and to said reception electrode, and said reference amplifier being coupled to said reception reference electrode. In an embodiment, said first coupling capacitor and said reference capacitor are identical. In an embodiment, the electronic circuit further comprises: a second transmitter stage; a second receiver stage; and a second coupling capacitor, coupled between the second transmitter stage and the second receiver stage, wherein said second receiver stage comprises: an additional compensation amplifier having a control terminal coupled to said gain controller. In an embodiment, said first transmitter stage and said transmission calibration stage are in a first region of a chip, and wherein said first reception stage and said reception calibration stage are in a second region of said chip.

In an embodiment, an electronic device comprises: a first integrated circuit, including: a first transmitter stage; and a transmission calibration stage; a second integrated circuit coupled to the first integrated and including: a first receiver stage including a first compensation variable-gain amplifier; a reception calibration stage including a first reference variable-gain amplifier; and a gain controller configured to control a gain of the first compensation amplifier and a gain of the first reference amplifier based on an output of the first reference amplifier; a first coupling capacitor coupled between the first transmitter stage and an input of the first compensation variable-gain amplifier of the first receiver stage; and a reference capacitor coupled between the transmission calibration stage and an input of the first reference variable-gain amplifier of the reception calibration stage. In an embodiment, said first coupling capacitor comprises a transmission electrode and a reception electrode; said reference capacitor comprises a transmission reference electrode and a reception reference electrode; said first transmitter stage and said first receiver stage are, respectively, coupled to said transmission electrode and to said reception electrode; said first reference amplifier is coupled to said reception reference electrode; said first and second integrated circuits have, respectively, a first top surface and a second top surface; said transmission electrode and said transmission reference electrode being arranged on said first top surface; said reception electrode and said reception reference electrode being arranged on said second top surface; and said first and second integrated circuits being arranged in face-to-face mode with said first and second top surfaces that face one another. In an embodiment, the gain controller is configured to generate a gain-control signal and the gain-control signal is coupled to a control terminal of the first reference amplifier and to a control terminal of the first compensation amplifier. In an embodiment, the first transmitter stage is configured to transmit a first differential communication signal; the transmission calibration state is configured to transmit a calibration differential signal, the first receiver stage comprises a second compensation variable-gain amplifier; the reception calibration stage comprises a second reference variable-gain amplifier; and the gain controller is configured to control the gain of the first compensation amplifier, a gain of the second compensation amplifier, the gain of the first reference amplifier and a gain of the second reference amplifier based on a differential output of the first reference amplifier and the second reference amplifier, wherein the device further comprises: a second coupling capacitor coupled between the first transmitter stage and an input of the second compensation variable-gain amplifier of the first receiver stage; and a second reference capacitor coupled between the transmission calibration stage and an input of the second reference variable-gain amplifier of the reception calibration stage.

In an embodiment, a communication method comprises: transmitting a communication signal on a transmission electrode of a coupling capacitor; receiving a reception signal on a reception electrode of said coupling capacitor; amplifying said reception signal; transmitting a transmission reference signal on a transmission reference electrode of a reference capacitor; receiving a coupling signal on a reception reference electrode of said reference capacitor; amplifying said coupling signal, generating a reception reference signal; generating a reception control signal as a function of said reception reference signal; and controlling a level of amplification of said amplifying said coupling signal and of the amplifying said reception signal as a function of said reception control signal. In an embodiment, the communication method further comprises: generating a reception reference voltage, wherein the generating a reception control signal comprises: determining a difference between an amplitude of said reception reference signal and said reception reference voltage. In an embodiment, the communication method further comprises: generating a transmission reference voltage; receiving a calibration signal; amplifying said calibration signal; generating a transmission reference signal; generating a transmission control signal as a function of said transmission reference signal and of said transmission reference voltage; and controlling a level of amplification in said amplifying said calibration signal, as a function of said transmission control signal. In an embodiment, said transmission reference signal and said reception reference signal are of a differential type.

In an embodiment, a system comprises: means for generating a time-variant first communication signal; means for transmitting the time-variant first communication signal; means for generating a time-variant reference transmission signal; means for transmitting the time-variant reference transmission signal; means for receiving the transmitted time-variant first communication signal; means for generating a first compensated signal from the received first communication signal; means for receiving the transmitted reference transmission signal; means for generating a reception reference signal based on the received reference transmission signal; and means for controlling a gain of the means for generating a first compensated signal and a gain of the means for generating a reception reference signal based on the reception reference signal. In an embodiment, the system further comprises: a first integrated circuit including the means for generating the first communication signal, the means for transmitting the first communication signal, the means for generating the reference transmission signal and the means for transmitting the reference transmission signal; and a second integrated circuit coupled to the first integrated circuit and including the means for receiving the first communication signal, the means for receiving the transmitted reference transmission signal, the means for generating the reception reference signal and the means for controlling. In an embodiment, the means for controlling comprises means for generating a reference voltage.

In an embodiment, a device comprises: a plurality of transmission electrodes of a plurality of capacitive couplings, the plurality of capacitive couplings configured to transmit time-variant communication signals; one or more reference transmission electrodes of a reference capacitive coupling, the reference capacitive coupling configured to transmit a time-variant transmission reference signal; a plurality of reception electrodes of the plurality of capacitive couplings; a plurality of coupling amplifiers communicatively coupled to respective reception electrodes of the plurality of capacitive couplings and configured to generate a plurality of compensated signals; one or more reference reception electrodes of the reference capacitive coupling; one or more reference amplifiers each having a signal input communicatively coupled to one of the one or more reference reception electrode of the reference capacitive coupling; and a reception gain control block configured to generate at least one gain control signal to control respective gains of the coupling amplifiers and of the one or more reference amplifiers based on at least one output of the one or more reference amplifiers. In an embodiment, the reception gain control block comprises a bandgap circuit configured to generate a reference voltage and a comparator configured to compare the reference voltage with an amplitude of the at least one output of the reference amplifiers. In an embodiment, each of the plurality of capacitive couplings comprises a pair of transmission electrodes and a pair of reception electrodes, the time-variant communication signals are differential signals, the time-variant reference signal is a differential signal and the one or more reference amplifiers comprises a pair of reference amplifiers.

In an embodiment, an integrated circuit comprises: a reception electrode of a first coupling capacitor configured to receive a first time-variant signal; a first coupling variable-gain amplifier having a first input communicatively coupled to the reception electrode of the first coupling capacitor and configured to generate a first compensated signal; a reference reception electrode of a reference capacitor configured to receive a time-variant reference signal; a reference variable-gain amplifier having a first input communicatively coupled to the reception electrode of the reference capacitor; and a reception gain control block coupled to an output of the reference variable-gain amplifier and configured to generate at least one gain control signal to control a gain of the first coupling variable-gain amplifier and a gain of the reference variable-gain amplifier based on the output of the reference variable-gain amplifier, wherein the reception gain control block comprises a bandgap circuit configured to generate a reference voltage and a comparator configured to compare the reference voltage with an amplitude of the output of the reference variable-gain amplifier. In an embodiment, the integrated circuit further comprises: a reception electrode of a second coupling capacitor configured to receive a second time-variant signal; and a second coupling variable-gain amplifier configured to generate a second compensated signal, wherein the reception gain control block is configured to control a gain of the second coupling variable-gain amplifier based on the output of the reference variable-gain amplifier.

In an embodiment, an integrated circuit comprises: a first signal transmission block including: a first signal transmission electrode of a first coupling capacitor; and a first transmitter coupled to the first signal transmission electrode of the first coupling capacitor and configured to generate a time-variant signal; and a transmission calibration block including: a reference transmission electrode of a reference coupling capacitor; a variable-gain amplifier having a calibration signal input configured to receive a calibration signal, a control input configured to receive a gain control signal and an output coupled to the reference transmission electrode; a comparator block coupled between the output of the variable gain amplifier and the control input of the variable gain amplifier to form a feed-back loop; and a bandgap block coupled to the comparator block and configured to provide a substantially constant reference voltage to the comparator block. In an embodiment, the transmitter is coupled to the calibration signal input of the variable-gain amplifier. In an embodiment, the integrated circuit further comprises a buffer coupled between the output of the variable-gain amplifier and the reference transmission electrode.

BRIEF DESCRIPTION OF THE SEVERAL VIEWS OF THE DRAWINGS

For a better understanding of the disclosure, embodiments thereof are now described, purely by way of non-limiting examples and with reference to the attached drawings, wherein.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, operational amplifiers, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
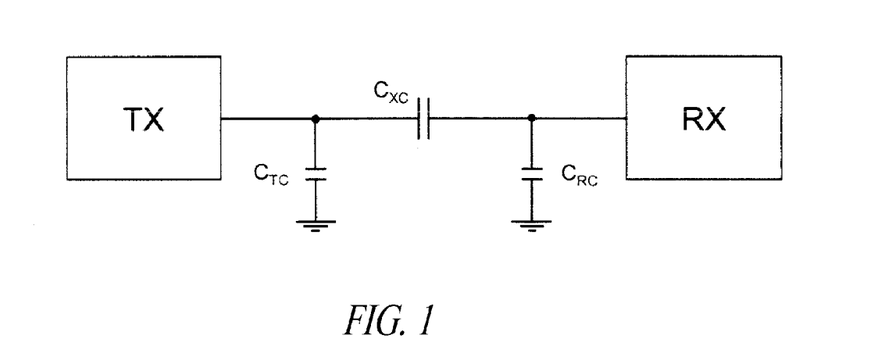
FIG. 1 shows a principle circuit diagram of a communication through capacitive coupling.

In greater detail, FIG. 1 shows a function block diagram regarding operation of a system for communicating through capacitive coupling, which comprises a transmitter TX and a receiver RX, coupled by means of a coupling capacitor $C_{XC}$. In general, between ground and the output of the transmitter TX and between ground and the input of the receiver RX, parasitic capacitors $C_{TC}$ and $C_{RC}$, respectively, are present.

Consequently, the transmitter TX and the receiver RX are connected by means of a capacitor network formed by the coupling capacitor $C_{XC}$ and by the parasitic capacitors $C_{TC}$, $C_{RC}$. Generally, the values of capacitance of the parasitic capacitors $C_{TC}$, $C_{RC}$ cannot be determined precisely. Consequently, if it is assumed that the transmitter TX transmits on its own output a signal $s_{TX}$, it is not possible to determine precisely the corresponding signal $s_{Rx}$ that is received by the receiver RX. In particular, the signal $s_{RX}$ depends upon the signal $s_{TX}$ and also upon the capacitive divider H formed by the coupling capacitor $C_{XC}$ and by the parasitic capacitor $C_{RC}$. If $C_{XC}$ and $C_{RC}$ are the values of capacitance of the coupling capacitor $C_{XC}$ and of the parasitic capacitor $C_{RC}$, we hence have $H=C_{XC}/(C_{XC}+C_{RC})$.

Generally, because the voltage on the parasitic capacitor $C_{TC}$ is determined by the transmitter TX, the uncertainty associated with the parasitic capacitor $C_{TC}$ does not affect the capacitive divider H, which is, however, affected by the uncertainties associated with the parasitic capacitor $C_{RC}$ and with the coupling capacitor $C_{XC}$.

Consequently, it is generally not possible to determine with a high degree of precision the signal $s_{Rx}$ effectively received by the receiver RX. Generally, it is not possible to determine with certainty the degree of attenuation experienced by the signal $s_{TX}$ on account of the capacitive divider H introduced by the capacitive coupling.

The difficulty in determining the aforementioned attenuation represents a limit to the possibility of using systems for communicating through capacitive coupling, in particular in the case of the so-called three-dimensional structures for communications of an inter-chip type.

Figure 2:
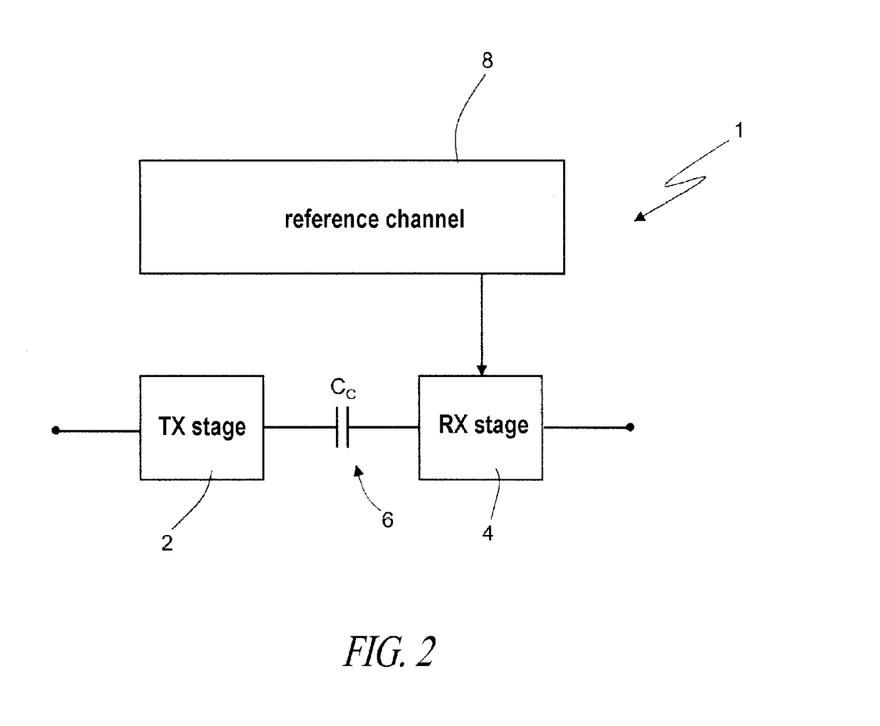
FIG. 2 shows a principle circuit diagram of an electronic circuit for communicating through capacitive coupling.

As illustrated schematically in FIG. 2, an electronic circuit for communicating through capacitive coupling, which for brevity will be referred to in what follows as communication circuit 1, comprises a first transmitter stage 2, a first receiver stage 4, and at least one first communications channel 6, which comprises a first coupling capacitor $C_C$, and couples the first transmitter stage 2 and the first receiver stage 4. In addition, the communication circuit 1 comprises a reference channel 8, described in greater detail hereinafter, which is coupled to the first receiver stage 4 and enables compensation of the attenuation introduced by the first communications channel 6.

As described in greater detail hereinafter, the first transmitter stage 2 and the first receiver stage 4 can belong to different chips or integrated circuits, or else can be formed within a single chip or integrated circuit.

Figure 3:
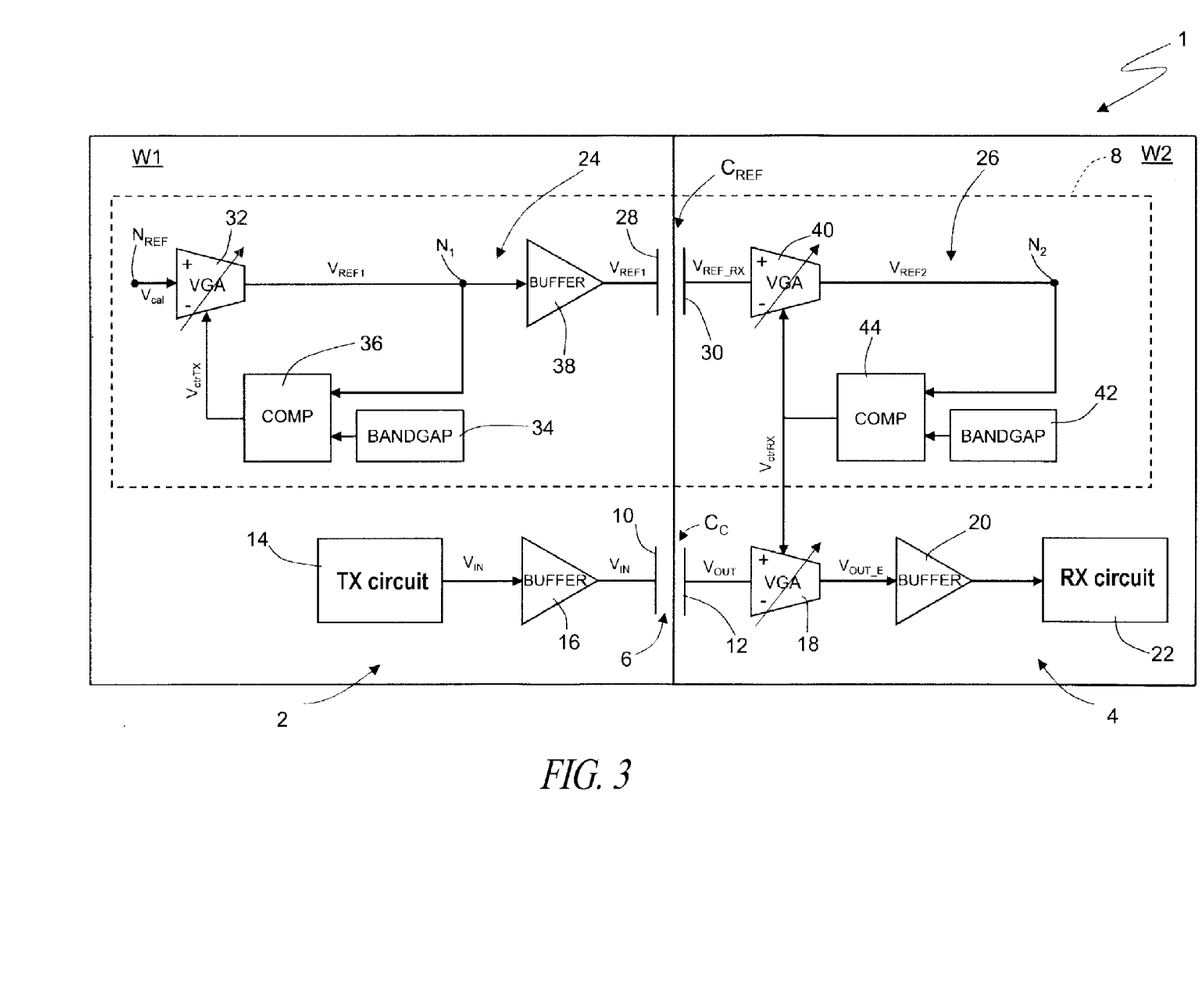
FIGS. 3 shows a circuit diagram as one possible embodiment of the present electronic circuit for communicating through capacitive coupling.

FIG. 3 shows in greater detail one embodiment of the present communication circuit 1, with particular reference, for example, to the case where the first transmitter stage 2 and the first receiver stage 4 are formed within a single chip. In this case, the first transmitter stage 2 and the first receiver stage 4 are obtained starting from a single substrate, but belong to different regions of the substrate.

In particular, the first transmitter stage 2 and the first receiver stage 4 are obtained, respectively, within a first region and a second region, which are designated by W1 and W2. These first and second regions W1, W2 are also known, in themselves, as wells. In addition, the first region W1 can be coupled to a first supply voltage VDDA and to a first ground GNDA, while the second region W2 can be coupled to a second supply voltage VDDB and to a second ground GNDB, which can differ from the first supply voltage VDDA and from the first ground GNDA, respectively.

In greater detail, the first coupling capacitor $C_C$ is formed by a first transmission electrode 10 and by a first reception electrode 12, which are coupled to the first region W1 and to the second region W2, respectively.

The first transmitter stage 2 comprises a transmitter circuit 14 and a first transmission buffer 16, which has an input coupled to the transmitter circuit 14, and an output coupled to the first transmission electrode 10.

In greater detail, the first transmission buffer 16 may be an amplifier circuit with unitary gain, and can be formed by a respective operational amplifier (not shown), the output terminal of which defines the output of the first transmission buffer 16 and is short-circuited to the negative input terminal of the operational amplifier. The output terminal is moreover coupled to the first transmission electrode 10, while the positive input terminal of the operational amplifier is coupled to the transmitter circuit 14.

In what follows, with regards to the buffers that will be described, for reasons of simplicity, the positive input terminals and the output terminals of the corresponding operational amplifiers will be referred to as "input" and "output" respectively, except where otherwise specified, assuming that these buffers are the same, from a circuit standpoint, as the first transmission buffer 16, and implying the short-circuit connection between the output terminals and the negative input terminals of the corresponding operational amplifiers.

Once again with reference to FIG. 3, the first receiver stage 4 comprises a compensation variable-gain amplifier (VGA) 18 of an analog type, a first reception buffer 20, and a receiver circuit 22. In particular, the compensation amplifier 18 has, in addition to a control terminal described hereinafter, an input coupled to the first reception electrode 12, and an output coupled to the input of the first reception buffer 20. The output of the first reception buffer 20 is then coupled to the receiver circuit 22.

Both the first transmission buffer 16 and the first reception buffer 20 are able to drive the loads present on the respective outputs: the first transmission electrode 10 and the receiver circuit 22. Consequently, when the transmitter circuit 14 generates a communication signal $V_{IN}$ of a digital or analog type, the latter is fed back to the first transmission electrode 10, with consequent generation, on the first reception electrode 12, of a corresponding received signal $V_{OUT}$.

For the reasons explained previously, even if we assume that the first transmission buffer 16 is ideal, the amplitude of the received signal $V_{OUT}$ is attenuated with respect to the amplitude of the communication signal $V_{IN}$. In order to compensate for this attenuation and obtain reception by the receiver circuit 22 of the same communication signal $V_{IN}$ as that generated by the transmitter circuit 14, it is possible to act on the compensation amplifier 18, by appropriately varying its gain. For this purpose, the control terminal of the compensation amplifier 18 is coupled to the reference channel 8, as described hereinafter.

In an embodiment, the reference channel 8 is formed by a transmission calibration stage 24, by a reception calibration stage 26, and by a first reference capacitor $C_{REF}$.

The first reference capacitor $C_{REF}$ is formed by a first transmission reference electrode 28 and by a first reception reference electrode 30, which are coupled, respectively, to the first region W1 and to the second region W2.

The transmission calibration stage 24 comprises a first reference amplifier 32, a first reference circuit 34, a first comparator stage 36, and a first reference buffer 38, which can be the same as the aforesaid first transmission buffer 16 and first reception buffer 20.

The first reference amplifier 32 is of a variable-gain analog type, and has an input, an output, and a control terminal. The input of the first reference amplifier 32 defines a first calibration node $N_{REF}$, while the output of the first reference amplifier 32 defines a first first-feedback node $N_1$, and is coupled to the input of the first reference buffer 38, the output of which is coupled to the first transmission reference electrode 28. In addition, the output of the first reference amplifier 32 is coupled to the first comparator stage 36. The first comparator stage 36 has an output and a first input and a second input, the output of the first reference amplifier 32 being coupled to the first input of the first comparator stage 36. The second input of the first comparator stage 36 is, coupled to the first reference circuit 34, while the output of the first comparator stage 36 is coupled to the control terminal of the first reference amplifier 32, in such a way that the first reference amplifier 32 and the first comparator stage 36 define a first feedback loop.

The reception calibration stage 26 comprises a second reference amplifier 40, a second reference circuit 42, and a second comparator stage 44. In what follows, it is assumed, that the first calibration amplifier 18 and the second reference amplifier 40 are the same as one another, even though a person skilled in the art will be able to implement embodiments even in the case where the first calibration amplifier 18 and the second reference amplifier 40 are different. Possibly, also the first reference amplifier 32 can be the same as the first calibration amplifier 18 and the second reference amplifier 40.

The second comparator stage 44 has an output and a first input and a second input. In addition, the second reference amplifier 40 is of a variable-gain analog type, and has an input, an output, and a control terminal. In particular, the input of the second reference amplifier 40 is coupled to the first reception reference electrode 30, while the output of the second reference amplifier 40 defines a first second-feedback node $N_2$, and is coupled to the first input of the second comparator stage 44. The second input of the second comparator stage 44 is, coupled to the second reference circuit 42, while the output of the second comparator stage 44 is coupled to the control terminal of the second reference amplifier 40 in such a way that the second reference amplifier 40 and the second comparator stage 44 define a second feedback loop. In addition, the output of the second comparator stage 44 is coupled to the control terminal of the compensation amplifier 18.

The first and second reference circuits 34, 42 supply, respectively, a first reference voltage $V_{BG1}$ and a second reference voltage $V_{BG2}$, both of a DC type. In an embodiment, the first and second reference circuits 34, 42 are each formed by a respective bandgap voltage reference, commonly known as bandgap circuit.

Bandgap circuits are used for generating reference voltages within integrated circuits in which the bandgap circuits themselves are integrated. In particular, given a generic bandgap circuit formed within a substrate made of semiconductor material, this bandgap circuit is able to supply a reference voltage that is very close to the bandgap voltage that characterizes the semiconductor material, or to a first approximation, the reference voltage is a function of the semiconductor material in which the bandgap circuit is formed, and generally does not depend upon other factors, like temperature, or the fabrication processes that have led to formation of the integrated circuit in which the bandgap circuit itself is present.

Consequently, the reference voltages supplied by bandgap circuits are substantially immune from factors such as, for example, process non-uniformities, differences in technology (for example, 1V CMOS, 3.3V CMOS or BiCMOS technology), and temperature. Purely by way of example, in the case where the semiconductor material is silicon, various types of bandgap circuits are available, capable of supplying reference voltages very close to 1.2V.

Figure 4:
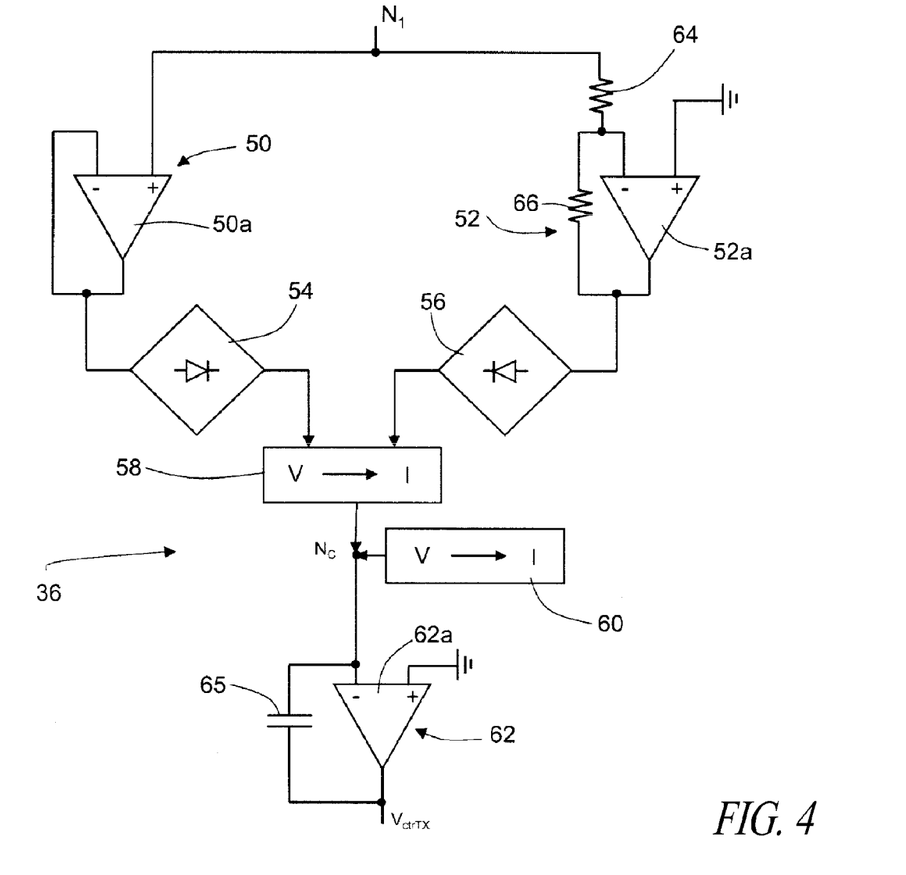
FIG. 4 shows a circuit diagram of a comparator stage.

FIG. 4 shows in greater detail the first comparator stage 36, which is coupled to the first first-feedback node $N_1$. In particular, in the embodiment illustrated in this Figure, the first comparator stage 36 comprises a first comparison buffer 50 and a second comparison buffer 52, a first rectifier 54 and a second rectifier 56 both of a single half-wave type, a first voltage-to-current converter 58 and a second voltage-to-current converter 60, and an integrator 62.

For one embodiment the first and second comparison buffers 50, 52 are formed by respective operational amplifiers, designated by 50a, 52a. The first first-feedback node $N_1$ is coupled to the input of the first comparison buffer 50, i.e., to the positive input terminal of the operational amplifier 50a of the first comparison buffer 50. In addition, the first first-feedback node $N_1$ is coupled to the negative input terminal of the operational amplifier 52a of the second comparison buffer 52, possibly by interposition of a buffer resistor 64 coupled in series between the first first-feedback node $N_1$ and the negative input terminal of the operational amplifier 52a of the second comparison buffer 52, the positive input terminal of which is coupled to ground. In addition, coupled between the negative input terminal and the output terminal of the operational amplifier 52a of the second comparison buffer 52 is a feedback resistor 66; in practice, the second comparison buffer 52 is an inverting buffer.

The first and second rectifiers 54, 56 have respective inputs, coupled, respectively, to the output of the first comparison buffer 50 and to the output of the second comparison buffer 52, and hence to the output terminals of the operational amplifiers 50a, 52a of the first and second comparison buffers 52. In addition, the first and second rectifiers 54, 56 have a respective output.

The first voltage-to-current converter 58 has one output and two input terminals, the latter being coupled, respectively, to the output of the first rectifier 54 and to the output of the second rectifier 56. Operatively, when on the output of the first voltage-to-current converter 58 a load is present, this load is traversed by a current that does not depend upon the load itself, but rather upon the voltage difference present between the inputs of the first voltage-to-current converter 58.

The second voltage-to-current converter 60 may be the same as the first voltage-to-current converter 58, and hence it also has one output and two input terminals. In particular, the two input terminals of the second voltage-to-current converter 60 are coupled to the first reference circuit 34 in such a way that present across them is the first reference voltage $V_{BG1}$. The output of the second voltage-to-current converter 60 is coupled to the output of the first voltage-to-current converter 58, and defines a comparison node $N_C$.

The integrator 62 may be formed by a respective operational amplifier 62a and by an integration capacitor 65. The negative input terminal of the operational amplifier 62a is coupled to the comparison node $N_C$. In addition, the negative input terminal of the operational amplifier 62a is coupled, through the integration capacitor 65, to the output terminal of the operational amplifier 62a itself, which is in turn coupled to the control terminal of the first reference amplifier 32 (connection not shown). In addition, the positive input terminal of the operational amplifier 62a is coupled to ground.

In an embodiment, in the comparison node $N_c$ there converge the currents generated by the first and second voltage-to-current converters 58, 60, these currents having directions such that the integrator 62 integrates a current equal to the difference between the currents generated by the first and second voltage-to-current converters 58, 60. On the output of the integrator 62 there is hence generated a first control signal $V_{ctrTX}$, which is supplied to the control terminal of the first reference amplifier 32.

The second comparator stage 44 may have the same architecture as the first comparator stage 36, and supplies a second control signal $V_{ctrRX}$ on the control terminals of the second reference amplifier 40 and of the compensation amplifier 18.

Operatively, the behavior of the communication circuit 1 is now described assuming that the communication signal $V_{IN}$ transmitted by the transmitter circuit 14 is of a time-variable type, and that the first calibration node $N_{REF}$ receives a calibration signal $V_{cal}$ of a time-variable type. For instance, the first calibration node $N_{REF}$ may be coupled to the transmitter circuit 14, in such a way that the calibration signal $V_{cal}$ is formed by the communication signal $V_{IN}$. In general, however, the calibration signal $V_{cal}$ can differ from the communication signal $V_{IN}$.

In use, the communication signal $V_{IN}$ is present on the first transmission electrode 10; consequently, on the first reception electrode 12, and hence at input to the compensation amplifier 18, the received signal $V_{OUT}$ is present. A compensated signal $V_{OUT\_E}$ is present on the output of the compensation amplifier 18.

With regards to the reference channel 8, on the output of the first reference amplifier 32, and hence on the first first-feedback node $N_1$, a first reference signal $V_{REF1}$ is present, which is likewise present on the first transmission reference electrode 28. Given the capacitive coupling between the first transmission reference electrode 28 and the first reception reference electrode 30, on the input of the second reference amplifier 40 a coupling signal $V_{REF\_RX}$ is set up. On the output of the second reference amplifier 40, and hence on the first second-feedback node $N_2$, a second reference signal $V_{REF2}$ is, instead, present.

Due to the first feedback loop, the first control signal $V_{ctrTX}$ controls the gain of the first reference amplifier 32 in such a way that the first (time-variable) reference signal $V_{REF1}$ has an amplitude independent of the amplitude of the calibration signal $V_{cal}$ and directly proportional to the first reference voltage $V_{BG1}$ generated by the first reference circuit 34. In detail, in steady-state conditions, the first control signal $V_{ctrTX}$ assumes a constant value that depends upon the amplitude of the calibration signal $V_{cal}$ and upon the first reference voltage $V_{BG1}$.

Likewise, on account of the inevitable presence of a capacitive divider formed by the first reference capacitor $C_{REF}$ and by parasitic capacitors, the coupling signal $V_{REF\_RX}$ has an amplitude smaller than the amplitude of the first reference signal $V_{REF1}$. However, thanks to the second feedback loop, the second control signal $V_{ctrRX}$ controls the gain of the second reference amplifier 40 in such a way that the second reference signal $V_{REF2}$, which is also time-variable, has an amplitude directly proportional to the second reference voltage $V_{BG2}$ generated by the second reference circuit 42. In detail, in steady-state conditions the second control signal $V_{ctrRX}$ assumes a constant value that depends upon the amplitude of the coupling signal $V_{REF\_RX}$ and upon the second reference voltage $V_{BG2}$.

In the case where the first and second reference voltages $V_{BG1}$, $V_{BG2}$ are the same as one another, the following relation applies:

$$AV_{REF1} = k \cdot V_{BG1} = AV_{REF2} = k \cdot V_{BG2},$$

where $AV_{REF1}$ and $AV_{REF2}$ are the amplitudes of the first reference signal $V_{REF1}$ and of the second reference signal $V_{REF2}$, respectively, and k is a coefficient of proportionality, the value of which depends upon the architectures of the first and of the second comparator stage 36, 44, which, as has been mentioned previously, are the same as one another.

In an embodiment, the second reference signal $V_{REF2}$ has the same amplitude and the same temporal evolution as the first reference signal $V_{REF1}$, which, amongst other things, has the same temporal evolution as the calibration signal $V_{cal}$. In other words, the second control signal $V_{ctrRX}$ determines the gain of the second reference amplifier 40 in such a way as to compensate for the attenuation introduced by the capacitive divider formed by the first reference capacitor $C_{REF}$.

Given that the second control signal $V_{ctrRX}$ moreover controls the gain of the compensation amplifier 18, the attenuation introduced by the capacitive divider associated to the first coupling capacitor $C_C$ is also compensated. Consequently, the compensated signal $V_{OUT\_E}$ has, in addition to the same temporal evolution, also the same amplitude as the communication signal $V_{IN}$.

In order to optimize the compensation of the attenuation introduced by the capacitive divider associated to the first coupling capacitor $C_C$, it is possible to obtain the first reference capacitor $C_{REF}$ and the first coupling capacitor $C_C$ in such a way that are the same as one another, and hence have one and the same capacitance. In particular, it is possible to form and arrange the first transmission reference electrode 28 and the first reception reference electrode 30 in such a way that they have the same shapes, respectively, as the first transmission electrode 10 and the first reception electrode 12. In addition, it is possible to obtain the first transmission reference electrode 28 and the first reception reference electrode 30 in such a way that their mutual arrangement is the same as the mutual arrangement of the first transmission electrode 10 and of the first reception electrode 12.

Alternatively, it is in any case possible to provide the first reference capacitor $C_{REF}$ and the first coupling capacitor $C_C$ in such a way that they have different values of capacitance, even though this entails an offset in the compensation of the attenuations introduced by the first reference capacitor $C_{REF}$ and by the first coupling capacitor $C_C$. This offset can be recovered, by way of example, by means of an appropriate fixed-gain amplifier (not shown), to be inserted, for example, between the calibration amplifier 18 and the first reception buffer 20.

Figure 5:
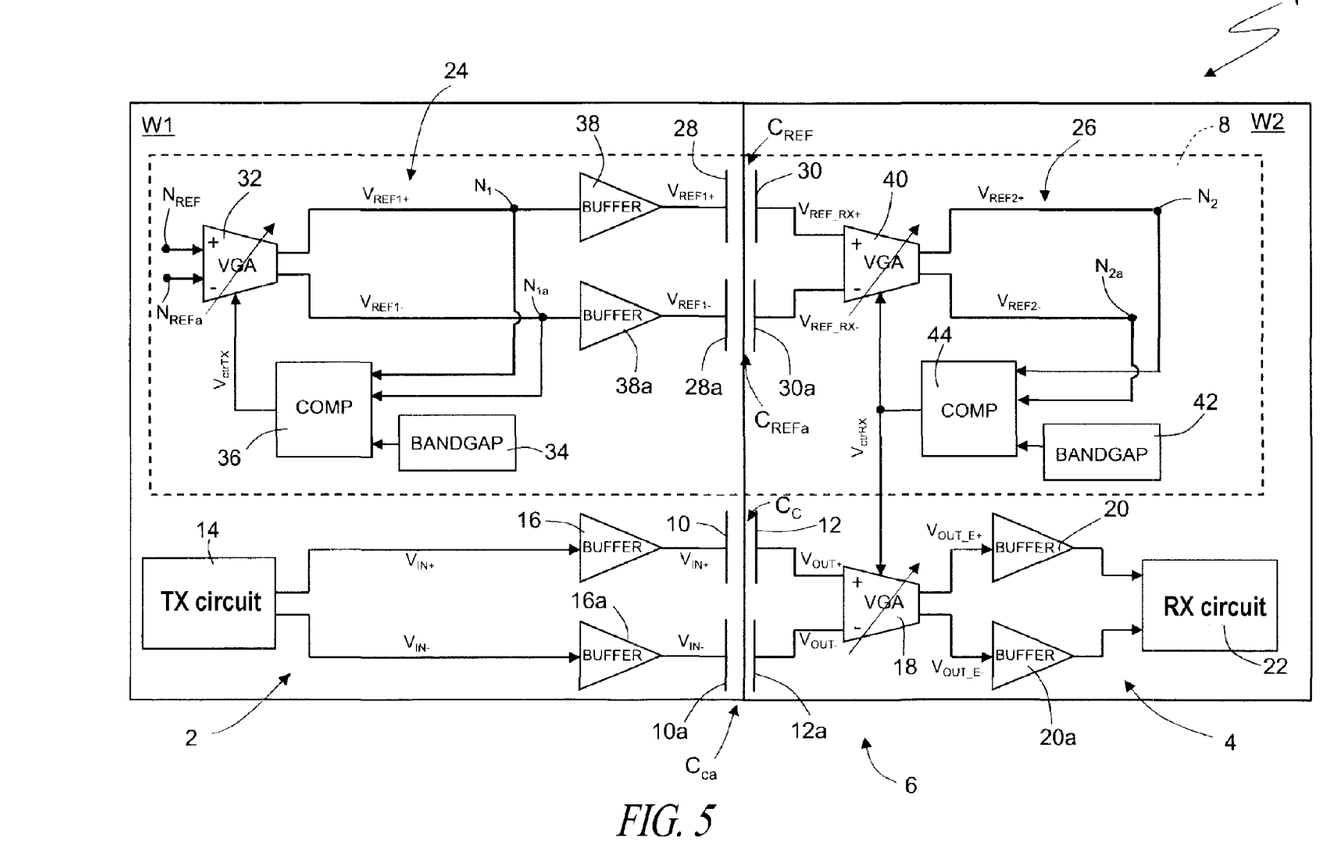
FIG. 5 shows yet another possible embodiment of the present electronic circuit for communicating through capacitive coupling.

FIG. 5 shows a different embodiment of the communication circuit 1, in which the communication signal $V_{IN}$, the received signal $V_{OUT}$, the compensated signal $V_{OUT\_E}$, the calibration signal $V_{cal}$, the first and second reference signals $V_{REF1}$, $V_{REF2}$, and moreover the coupling signal $V_{REF\_RX}$ are of a differential type, instead of so-called "single-ended" type.

Consequently, as described in detail hereinafter, instead of the aforementioned signals, a positive communication signal $V_{IN+}$, a positive received signal $V_{OUT+}$, a positive compensated signal $V_{OUT\_E+}$, a positive calibration signal $V_{cal+}$, a first positive reference signal $V_{REF1+}$, and a second positive reference signal $V_{REF2+}$, and moreover a positive coupling signal $V_{REF\_RX+}$ are, respectively, transmitted. Each of the aforementioned positive signals is in phase opposition with respect to the corresponding negative signal.

In addition, in an embodiment, the communication circuit 1 comprises a second transmission buffer 16a, a second transmission electrode 10a, a second reception electrode 12a, and a second reception buffer 20a. In addition, the compensation amplifier 18 and the first and second reference amplifiers 32, 40 are of a differential type; i.e., they have respective inputs and outputs of a differential type in such a way that are able to amplify signals of a differential type.

In particular, the second transmission buffer 16a is coupled to the transmitter circuit 14 so as to receive a negative communication signal $V_{IN-}$, which forms, together with the positive communication signal $V_{IN+}$, the communication signal $V_{IN}$. The second transmission buffer 16a is coupled to the second transmission electrode 10a, which forms, together with the second reception electrode 12a, a second coupling capacitor $C_{Ca}$. The second reception electrode 12a is in turn coupled to the compensation amplifier 18, in such a way that, when on the second reception electrode 12a there is a negative received signal $V_{OUT-}$, the compensation amplifier 18 amplifies the received signal $V_{OUT}$ formed by the positive received signal $V_{OUT+}$ and by the negative received signal $V_{OUT-}$, thus generating, in addition to the aforementioned positive compensated signal $V_{OUT\_E+}$, a corresponding negative compensated signal $V_{OUT\_E-}$.

Likewise, the input of the first reference amplifier 32 defines, in addition to the first calibration node $N_{REF}$, a second calibration node $N_{REFa}$, in such a way that the first reference amplifier 32 can receive, in addition to the positive calibration signal $V_{cal+}$, a corresponding negative calibration signal $V_{cal-}$, such as, for example, the negative communication signal $V_{IN-}$. In addition, the output of the first reference amplifier 32 defines, in addition to the first first-feedback node $N_1$, a second first-feedback node $N_{1a}$, on which the first reference amplifier 32 supplies a first negative reference signal $V_{REF1-}$ corresponding to the first positive reference signal $V_{REF1+}$.

In an embodiment, the first comparator stage 36 is without the first and second comparison buffers 50, 52. The first first-feedback node $N_1$ and the second first-feedback node $N_{1a}$ are directly connected, respectively, to the first rectifier 54 and to the second rectifier 56. Also in an embodiment, the second comparator stage 44 is the same as the first comparator stage 36.

The communication circuit 1 further comprises a second reference buffer 38a, and a second reference capacitor $C_{REFa}$, which is formed by a second transmission reference electrode 28a and by a second reception reference electrode 30a.

The second first-feedback node $N_{1a}$ is coupled to the input of the second reference buffer 38a, the output of which is coupled to the second transmission reference electrode 28a, which hence receives the first negative reference signal $V_{REF1-}$. The second reception reference electrode 30a is, instead, coupled to the input of the second reference amplifier 40, and receives a negative coupling signal $V_{REF\_RX-}$, in such a way that the second reference amplifier 40 amplifies the coupling signal $V_{REF\_RX}$ of a differential type and formed by the positive coupling signal $V_{REF\_RX+}$ and by the negative coupling signal $V_{REF\_RX-}$.

The output of the second reference amplifier 40 defines, in addition to the first second-feedback node $N_2$, a second second-feedback node $N_{2a}$, which receives a second negative reference signal $V_{REF2-}$, which corresponds to the second positive reference signal $V_{REF2+}$. The first and second second-feedback nodes $N_2$, $N_{2a}$ are thus coupled to the second comparator stage 44, in a way similar to what occurs for the first and second first-feedback nodes $N_1$, $N_{1a}$ and the first comparator stage 36.

The embodiment illustrated in FIG. 5 facilitates minimization of the effects due to the noise on the signals transmitted in the communication circuit 1.

Figure 6:
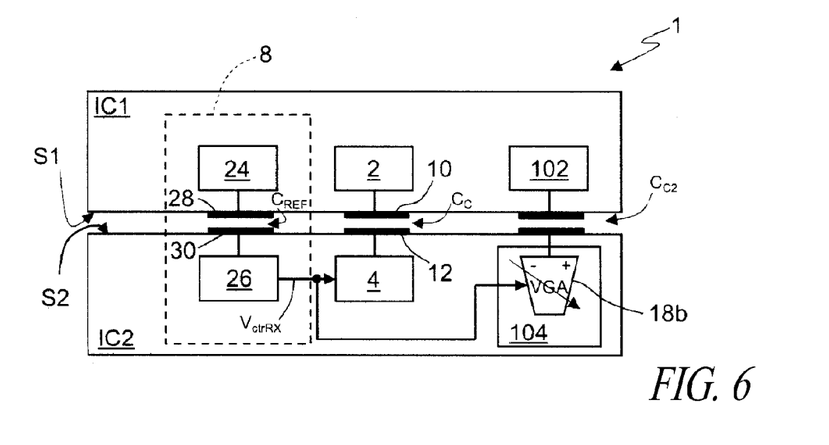
FIG. 6 is a schematic illustration of a different embodiment of the present electronic circuit for communicating through capacitive coupling.

By way of example, FIG. 6 shows a further embodiment of the present communication circuit 1, in which the first transmitter stage 2 and the first receiver stage 4 are formed, respectively, within a first integrated circuit IC1 and a second integrated circuit, IC2, and consequently do not share the same substrate.

The first and second integrated circuits IC1, IC2 define, respectively, a first top surface S1 and a second top surface S2, and are arranged in the so-called face-to-face mode, in such a way that the first and second top surfaces S1, S2 face one another. For instance, assuming that the first and second integrated circuits IC1, IC2 are formed by respective bodies of semiconductor material (not shown), the first and second top surfaces S1, S2 can be defined, respectively, by the bodies of semiconductor material of the first and second integrated circuits IC1, IC2. Alternatively, the first and second top surfaces S1, S2 can be defined by respective top regions (not shown) of the first and second integrated circuits IC1, IC2, arranged on the respective bodies of semiconductor material, and comprising, for example, metallizations and/or dielectric layers.

The first transmitter stage 2 and the first receiver stage 4 are again coupled by means of the first coupling capacitor $C_C$, the first transmission electrode 10 and first reception electrode 12 of which extend, respectively, on the first and second top surfaces S1, S2.

The first and second integrated circuits IC1, IC2 house, respectively, the transmission calibration stage 24 and the reception calibration stage 26. In addition, the first transmission reference electrode 28 and the first reception reference electrode 30 extend, respectively, on the first and second top surfaces S1, S2.

The embodiment illustrated in FIG. 6 further comprises a second transmitter stage 102 and a second receiver stage 104, formed, respectively, within the first and second integrated circuits IC1, IC2, and coupled by a second coupling capacitor $C_{C2}$ having electrodes that extend, respectively, on the first and second top surfaces S1, S2.

The second receiver stage 104 comprises a respective calibration amplifier 18b, of a variable-gain type, the control terminal of which receives the second control signal $V_{ctrRx}$ generated by the reception calibration stage 26 in such a way as to compensate for possible distortions in amplitude introduced by the capacitive divider associated to the second coupling capacitor $C_{C2}$ on the signals transmitted between the second transmitter stage 102 and the second receiver stage 104. For this purpose, it is possible to form the second coupling capacitor $C_{C2}$ in such a way that it has the same capacitance as the first reference capacitor $C_{REF}$; in particular, it is possible to form and arrange the electrodes of the second coupling capacitor $C_{C2}$ in such a way that they have the same shapes, respectively, as the first transmission reference electrode 28 and the first reception reference electrode 30, as well as the same mutual arrangement.

The embodiment shown in FIG. 6 facilitates compensation of the signals transmitted through two communication channels by using a single reference channel. Further communication channels can then be introduced between pairs of further transmitter and receiver stages (not shown).

It may be noted how, also in the case of a communication circuit 1 that extends through two different integrated circuits, it is possible to adopt signals of a differential type, with consequent circuit modifications, as previously shown in FIG. 5. On the other hand, also in the case where the communication circuit 1 extends in a single chip, it is possible to introduce further communication channels between pairs of further transmitter and receiver stages.

Advantages that embodiments of the communication circuit 1 may afford emerge from the foregoing description. An embodiment may enable compensation of the distortions of amplitude that afflict systems for communicating through capacitive coupling. In particular, in the case of a communication circuit 1 that extends through two different integrated circuits, an embodiment may enable implementation of so-called three-dimensional structures formed by a number of integrated circuits.

Modifications and variations may be made to the communication circuit 1 described and illustrated herein, without thereby departing from the sphere of the present disclosure.

For instance, the first and the second comparator stages 36, 44 may be different from the one described. By way of example, they may comprise double half-wave rectifiers. In addition, one or more of the buffers described may be absent.

Likewise, it is not necessary for the first and second integrated circuits IC1, IC2 to be arranged in face-to-face mode.

It is possible for the first and second reference voltages $V_{BG1}$, $V_{BG2}$ to be different, for example, because the first and second reference circuits 34, 42 are provided in substrates made of different materials, in which case the second control signal $V_{ctrRx}$ controls the gain of the calibration amplifier 18 in such a way that the compensated signal $V_{OUT\_E}$ has an amplitude different from the amplitude of the communication signal $V_{IN}$. Knowing the ratio between the first reference voltage $V_{BG1}$ and the second reference voltage $V_{BG2}$ it is in any case possible to equalize the amplitude of the compensated signal $V_{OUT\_E}$ with respect to the amplitude of the communication signal $V_{IN}$, for example, by using an appropriate fixed-gain amplifier.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic communication circuit, comprising:
   a first transmitter stage;
   a first receiver stage; and
   a first coupling capacitor coupled between the first transmitter stage and the first receiver stage, said first receiver stage including a compensation amplifier of a variable-gain type coupled between the first coupling capacitor and an output of the electronic communication circuit; and
   a reference channel including:
      a transmission calibration stage;
      a reception calibration stage; and
      a reference capacitor coupled between the transmission calibration stage and the reception calibration stage, wherein the reception calibration stage includes:
         a reference amplifier of a variable-gain type, which has an input coupled to said reference capacitor; and
         a gain controller having an input coupled to an output of the reference amplifier and configured to generate at least one control signal to control a gain of the reference amplifier and a gain of the compensation amplifier based on the output of the reference amplifier.

2. The electronic circuit according to claim 1 wherein said gain-controller comprises:
   a reception reference voltage generator configured to generate a reception reference voltage; and
   a reception comparison stage, coupled to the output of said reference amplifier and to said reception reference voltage generator, and configured to supply a reception control signal indicating a difference between an amplitude of a reception reference signal present on the output of said reference amplifier and said reception reference voltage.

3. The electronic circuit according to claim 2 wherein said transmission calibration stage comprises:
   a transmission reference voltage generator configured to generate a transmission reference voltage;
   a transmission amplifier of a variable-gain type, which has an output coupled to said reference capacitor; and
   a transmission comparison stage, coupled to the output of said transmission amplifier and to said transmission reference voltage generator, and configured to supply a transmission control signal indicating a difference between an amplitude of a transmission reference signal present on the output of said transmission amplifier and said transmission reference voltage, and said transmission control signal being coupled to a control terminal of said transmission amplifier.

4. The electronic circuit according to claim 3 wherein said transmission reference signal and said reception reference signal are of a differential type.

5. The electronic circuit according to claim 3 wherein said transmission and reception reference voltage generators are bandgap voltage generators.

6. The electronic circuit according to claim 2 wherein said reception comparison stage comprises:
   a first conversion circuit configured to generate a first current proportional to the amplitude of said reception reference signal;
   a second conversion circuit configured to generate a second current proportional to said reception reference voltage; and
   an integrator configured to integrate in time a current difference proportional to a difference between said first and second currents, generating said reception control signal.

7. The electronic circuit according to claim 1 wherein the at least one gain control signal is a gain control signal coupled to a control terminal of the reference amplifier and to a control terminal of the compensation amplifier.

8. The electronic circuit according to claim 1 wherein:
   said first coupling capacitor comprises:
      a transmission electrode; and
      a reception electrode; and
   said reference capacitor comprises:
      a transmission reference electrode; and
      a reception reference electrode, said first transmitter stage and said first receiver stage being, respectively, coupled to said transmission electrode and to said reception electrode, and said reference amplifier being coupled to said reception reference electrode.

9. The electronic circuit according to claim 8 wherein said first coupling capacitor and said reference capacitor are identical.

10. The electronic circuit according to claim 1, further comprising:
    a second transmitter stage;
    a second receiver stage; and
    a second coupling capacitor, coupled between the second transmitter stage and the second receiver stage, wherein said second receiver stage comprises:
       an additional compensation amplifier having a control terminal coupled to said gain controller.

11. The electronic circuit according to claim 1 wherein said first transmitter stage and said transmission calibration stage are in a first region of a chip, and wherein said first reception stage and said reception calibration stage are in a second region of said chip.

12. An electronic device comprising:
    a first integrated circuit, including:
       a first transmitter stage; and
       a transmission calibration stage;
    a second integrated circuit coupled to the first integrated circuit and including:
       a first receiver stage including a first compensation variable-gain amplifier;
       a reception calibration stage including a first reference variable-gain amplifier; and
       a gain controller configured to control a gain of the first compensation amplifier and a gain of the first reference amplifier based on an output of the first reference amplifier;
    a first coupling capacitor coupled between the first transmitter stage and an input of the first compensation variable-gain amplifier of the first receiver stage; and
    a reference capacitor coupled between the transmission calibration stage and an input of the first reference variable-gain amplifier of the reception calibration stage.

13. The electronic device according to claim 12 wherein:
    said first coupling capacitor comprises a transmission electrode and a reception electrode;
    said reference capacitor comprises a transmission reference electrode and a reception reference electrode;

said first transmitter stage and said first receiver stage are, respectively, coupled to said transmission electrode and to said reception electrode;
said first reference amplifier is coupled to said reception reference electrode;
said first and second integrated circuits have, respectively, a first top surface and a second top surface;
said transmission electrode and said transmission reference electrode being arranged on said first top surface;
said reception electrode and said reception reference electrode being arranged on said second top surface; and
said first and second integrated circuits being arranged in face-to-face mode with said first and second top surfaces that face one another.

14. The electronic device according to claim 12 wherein the gain controller is configured to generate a gain-control signal and the gain-control signal is coupled to a control terminal of the first reference amplifier and to a control terminal of the first compensation amplifier.

15. The electronic device of claim 12 wherein:
the first transmitter stage is configured to transmit a first differential communication signal;
the transmission calibration state is configured to transmit a calibration differential signal, the first receiver stage comprises a second compensation variable-gain amplifier;
the reception calibration stage comprises a second reference variable-gain amplifier; and
the gain controller is configured to control the gain of the first compensation amplifier, a gain of the second compensation amplifier, the gain of the first reference amplifier and a gain of the second reference amplifier based on a differential output of the first reference amplifier and the second reference amplifier, wherein the device further comprises:
   a second coupling capacitor coupled between the first transmitter stage and an input of the second compensation variable-gain amplifier of the first receiver stage; and
   a second reference capacitor coupled between the transmission calibration stage and an input of the second reference variable-gain amplifier of the reception calibration stage.

16. A communication method, comprising:
transmitting a communication signal on a transmission electrode of a coupling capacitor;
receiving a reception signal on a reception electrode of said coupling capacitor;
amplifying said reception signal;
transmitting a transmission reference signal on a transmission reference electrode of a reference capacitor;
receiving a coupling signal on a reception reference electrode of said reference capacitor;
amplifying said coupling signal, generating a reception reference signal;
generating a reception control signal as a function of said reception reference signal; and
controlling a level of amplification of said amplifying said coupling signal and of the amplifying said reception signal as a function of said reception control signal.

17. The communication method according to claim 16, further comprising:
generating a reception reference voltage, wherein the generating a reception control signal comprises:
   determining a difference between an amplitude of said reception reference signal and said reception reference voltage.

18. The communication method according to claim 17, further comprising:
generating a transmission reference voltage;
receiving a calibration signal;
amplifying said calibration signal;
generating a transmission reference signal;
generating a transmission control signal as a function of said transmission reference signal and of said transmission reference voltage; and
controlling a level of amplification in said amplifying said calibration signal, as a function of said transmission control signal.

19. The communication method according to claim 16, wherein said transmission reference signal and said reception reference signal are of a differential type.

20. A system, comprising:
means for generating a time-variant first communication signal;
means for transmitting the time-variant first communication signal;
means for generating a time-variant reference transmission signal;
means for transmitting the time-variant reference transmission signal;
means for receiving the transmitted time-variant first communication signal;
means for generating a first compensated signal from the received first communication signal;
means for receiving the transmitted reference transmission signal;
means for generating a reception reference signal based on the received reference transmission signal; and
means for controlling a gain of the means for generating a first compensated signal and a gain of the means for generating a reception reference signal based on the reception reference signal.

21. The system of claim 20, further comprising:
a first integrated circuit including the means for generating the first communication signal, the means for transmitting the first communication signal, the means for generating the reference transmission signal and the means for transmitting the reference transmission signal; and
a second integrated circuit coupled to the first integrated circuit and including the means for receiving the first communication signal, the means for receiving the transmitted reference transmission signal, the means for generating the reception reference signal and the means for controlling.

22. The system of claim 20 wherein the means for controlling comprises means for generating a reference voltage.

23. A device, comprising:
a plurality of transmission electrodes of a plurality of capacitive couplings, the plurality of capacitive couplings configured to transmit time-variant communication signals;
one or more reference transmission electrodes of a reference capacitive coupling, the reference capacitive coupling configured to transmit a time-variant transmission reference signal;
a plurality of reception electrodes of the plurality of capacitive couplings;
a plurality of coupling amplifiers communicatively coupled to respective reception electrodes of the plurality of capacitive couplings and configured to generate a plurality of compensated signals;
one or more reference reception electrodes of the reference capacitive coupling;

one or more reference amplifiers each having a signal input communicatively coupled to one of the one or more reference reception electrode of the reference capacitive coupling; and a reception gain control block configured to generate at least one gain control signal to control respective gains of the coupling amplifiers and of the one or more reference amplifiers based on at least one output of the one or more reference amplifiers.

24. The device of claim 23 wherein the reception gain control block comprises a bandgap circuit configured to generate a reference voltage and a comparator configured to compare the reference voltage with an amplitude of the at least one output of the reference amplifiers.

25. The device of claim 23 wherein each of the plurality of capacitive couplings comprises a pair of transmission electrodes and a pair of reception electrodes, the time-variant communication signals are differential signals, the time-variant reference signal is a differential signal and the one or more reference amplifiers comprises a pair of reference amplifiers.

26. An integrated circuit, comprising:
a reception electrode of a first coupling capacitor configured to receive a first time-variant signal;
a first coupling variable-gain amplifier having a first input communicatively coupled to the reception electrode of the first coupling capacitor and configured to generate a first compensated signal;
a reference reception electrode of a reference capacitor configured to receive a time-variant reference signal;
a reference variable-gain amplifier having a first input communicatively coupled to the reception electrode of the reference capacitor; and
a reception gain control block coupled to an output of the reference variable-gain amplifier and configured to generate at least one gain control signal to control a gain of the first coupling variable-gain amplifier and a gain of the reference variable-gain amplifier based on the output of the reference variable-gain amplifier, wherein the reception gain control block comprises a bandgap circuit configured to generate a reference voltage and a comparator configured to compare the reference voltage with an amplitude of the output of the reference variable-gain amplifier.

27. The integrated circuit of claim 26, further comprising:
a reception electrode of a second coupling capacitor configured to receive a second time-variant signal; and
a second coupling variable-gain amplifier configured to generate a second compensated signal, wherein the reception gain control block is configured to control a gain of the second coupling variable-gain amplifier based on the output of the reference variable-gain amplifier.

28. An integrated circuit, comprising:
a first signal transmission block including:
a first signal transmission electrode of a first coupling capacitor; and
a first transmitter coupled to the first signal transmission electrode of the first coupling capacitor and configured to generate a time-variant signal; and
a transmission calibration block including:
a reference transmission electrode of a reference coupling capacitor;
a variable-gain amplifier having a calibration signal input configured to receive a calibration signal, a control input configured to receive a gain control signal and an output coupled to the reference transmission electrode;
a comparator block coupled between the output of the variable gain amplifier and the control input of the variable gain amplifier to form a feed-back loop; and
a bandgap block coupled to the comparator block and configured to provide a substantially constant reference voltage to the comparator block.

29. The integrated circuit of claim 28 wherein the transmitter is coupled to the calibration signal input of the variable-gain amplifier.

30. The integrated circuit of claim 28, further comprising a buffer coupled between the output of the variable-gain amplifier and the reference transmission electrode.

* * * * *